United States Patent
Deuber

(10) Patent No.: US 8,613,247 B2
(45) Date of Patent: Dec. 24, 2013

(54) DEVICE AND ARRANGEMENT FOR PREPARING A LIQUID FOODSTUFF OR SEMI-LUXURY PRODUCT AND PORTIONED PACKAGING

(75) Inventor: Louis Deuber, Richterswil (CH)

(73) Assignee: Delica AG, Birsfelden (CH)

( * ) Notice: Subject to any disclaimer, the term of this patent is extended or adjusted under 35 U.S.C. 154(b) by 262 days.

(21) Appl. No.: 12/934,785

(22) PCT Filed: Mar. 19, 2009

(86) PCT No.: PCT/EP2009/053257
§ 371 (c)(1),
(2), (4) Date: Nov. 30, 2010

(87) PCT Pub. No.: WO2009/118269
PCT Pub. Date: Oct. 1, 2009

(65) Prior Publication Data
US 2011/0097463 A1   Apr. 28, 2011

(30) Foreign Application Priority Data

Mar. 28, 2008 (EP) .................................... 08103138

(51) Int. Cl.
*A47J 31/40* (2006.01)
(52) U.S. Cl.
USPC .......................... 99/289 R; 99/295; 99/302 P
(58) Field of Classification Search
USPC .......................... 99/289 R, 289 P, 295, 302 P
See application file for complete search history.

(56) References Cited

U.S. PATENT DOCUMENTS

| 5,134,924 | A  | * | 8/1992 | Vicker | 99/280 |
| 7,562,618 | B2 | * | 7/2009 | Jarisch et al. | 99/289 R |
| 7,703,380 | B2 | * | 4/2010 | Ryser et al. | 99/295 |
| 8,079,300 | B2 | * | 12/2011 | Jing | 99/289 R |
| 8,166,869 | B2 | * | 5/2012 | Cheng | 99/302 P |
| 8,210,096 | B2 | * | 7/2012 | Fin | 99/295 |

FOREIGN PATENT DOCUMENTS

| EP | 1 101 430 A1 | 5/2001 |
| EP | 1 344 722 A1 | 9/2003 |
| EP | 1 757 212 A2 | 2/2007 |
| EP | 1 859 714 A1 | 11/2007 |
| WO | 2005/058111 A1 | 6/2005 |
| WO | 2007/017455 A1 | 2/2007 |
| WO | 2008/004116 A1 | 1/2008 |

* cited by examiner

*Primary Examiner* — Reginald L Alexander
(74) *Attorney, Agent, or Firm* — Nath, Goldberg & Meyer; Jerald L. Meyer; Stanley N. Protigal

(57) ABSTRACT

A device for preparing a liquid foodstuff or semi-luxury product from an extraction product contained in a capsule with a liquid extractant comprises a positioning unit, which can be positioned by applying pressure onto a collar of the capsule in an insertion position between two chamber parts that are spaced from one another in an open position. The positioning unit is designed such that when the chamber parts are moved from the open position to the closed position, the positioning unit acts on the collar in such a way that the collar can be released from the insertion position of the positioning unit by bending or turning the collar down.

26 Claims, 12 Drawing Sheets

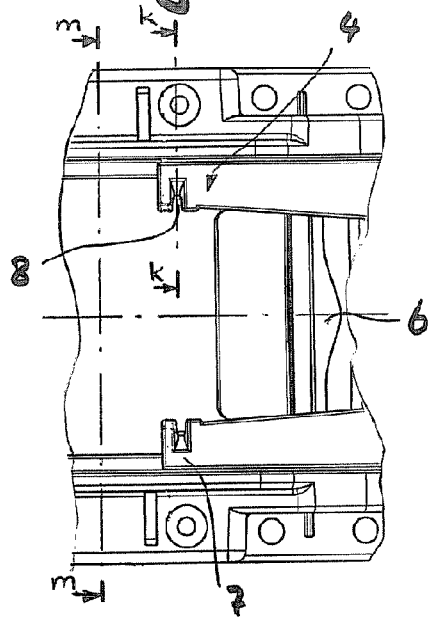
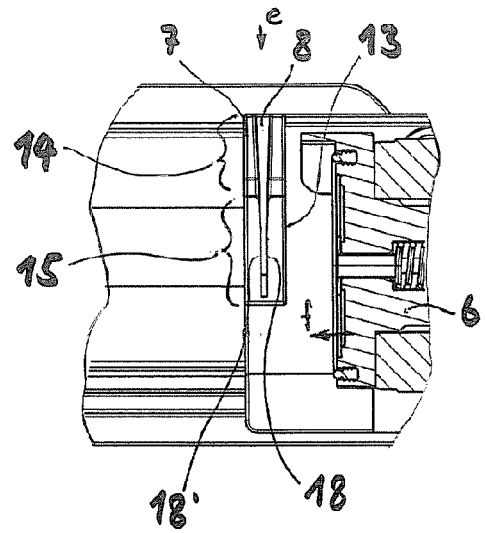
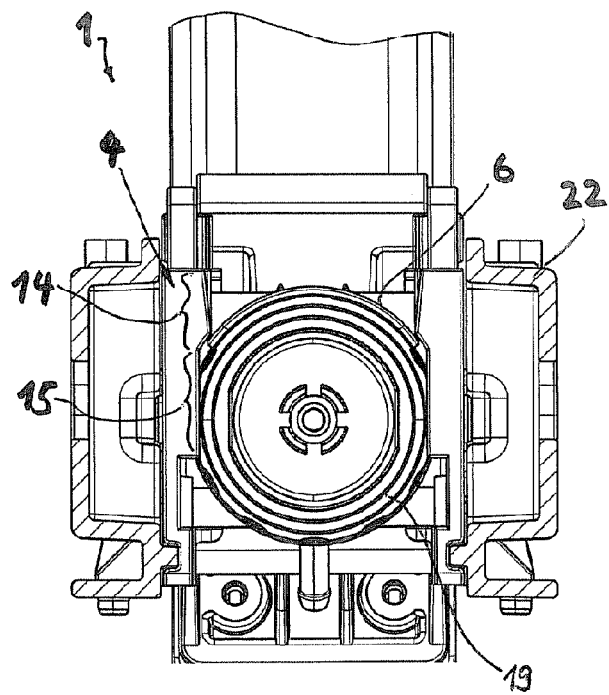
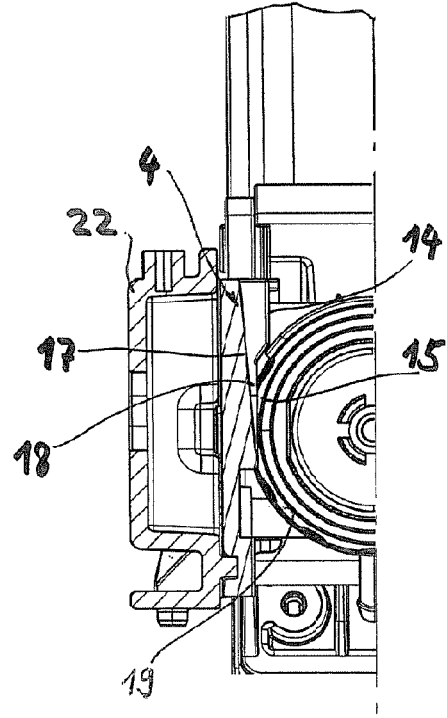

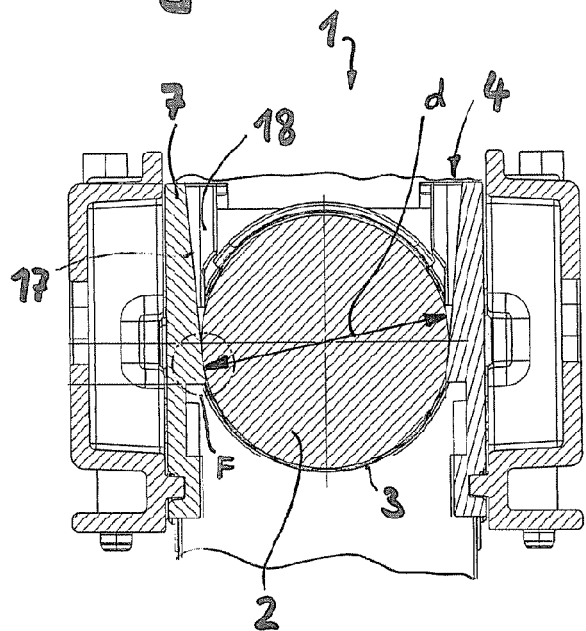
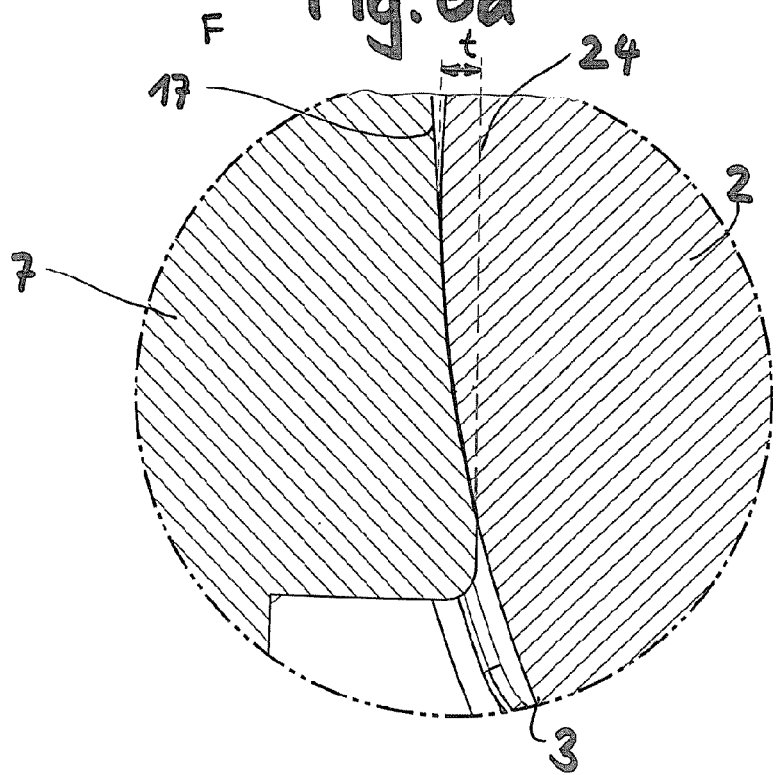

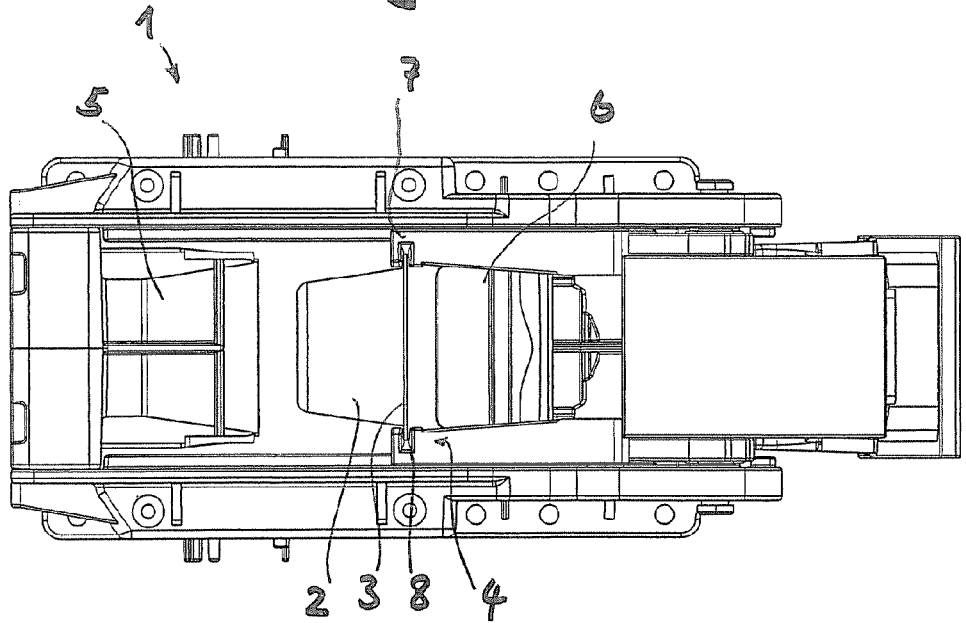
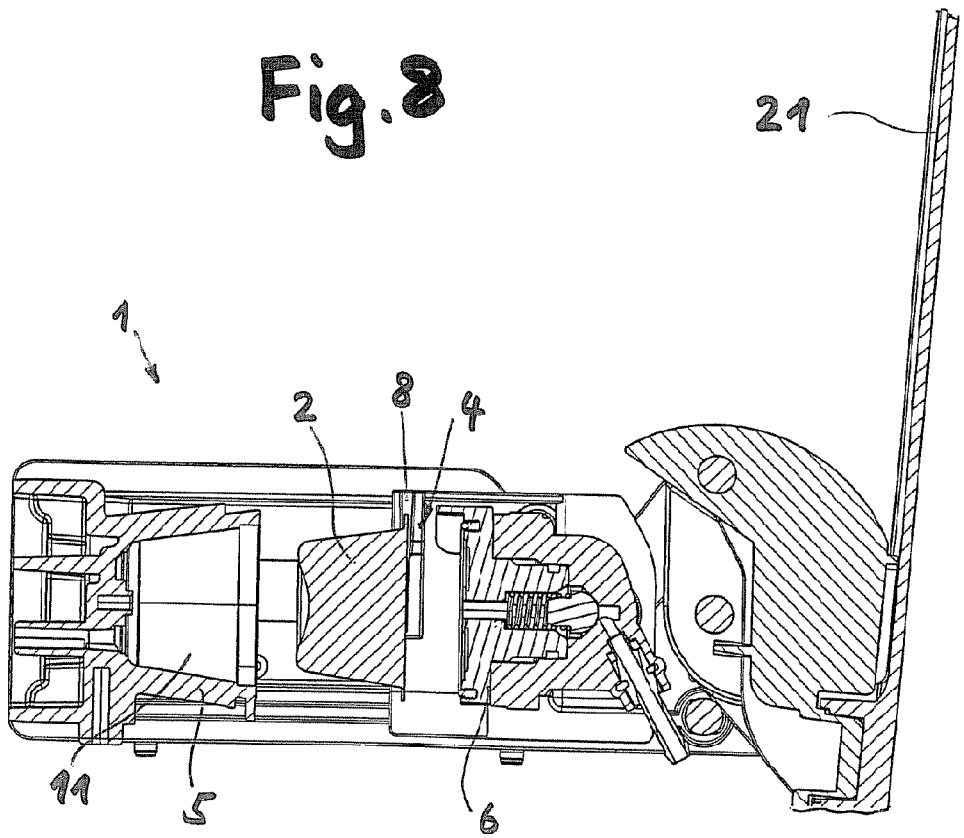

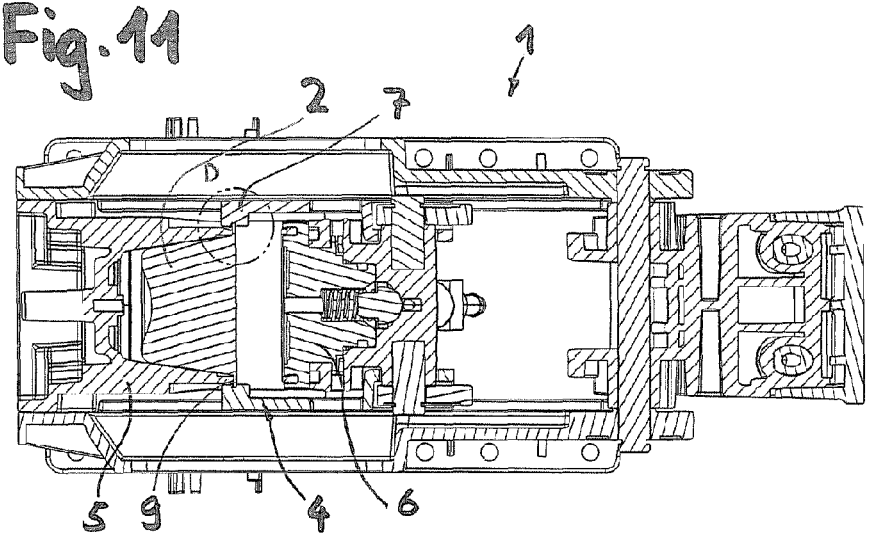
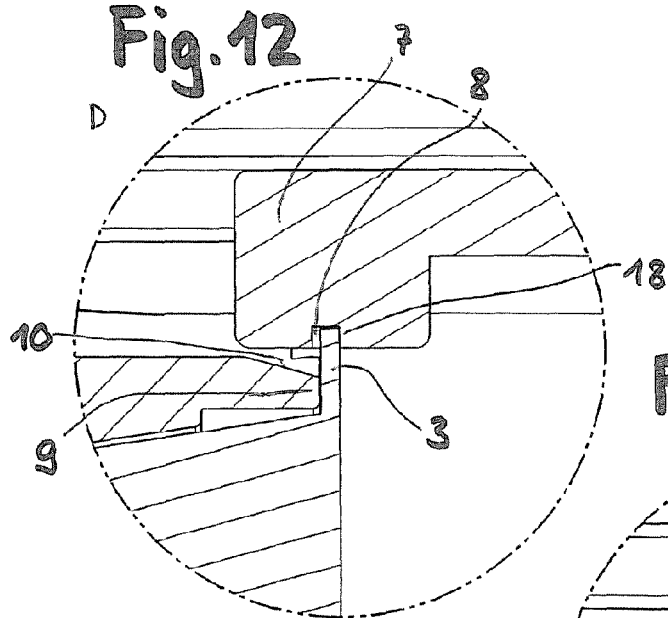
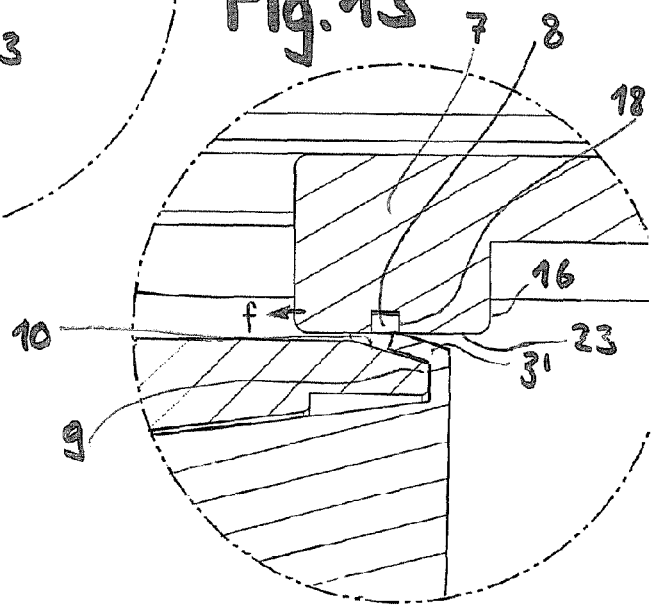

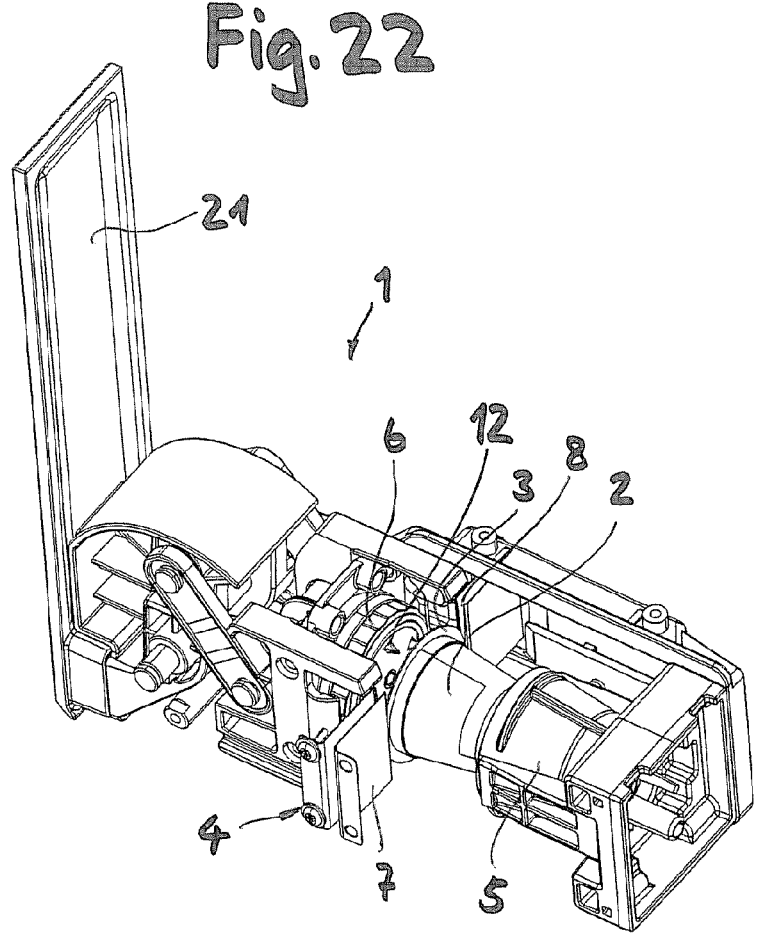

DEVICE AND ARRANGEMENT FOR PREPARING A LIQUID FOODSTUFF OR SEMI-LUXURY PRODUCT AND PORTIONED PACKAGING

This is a National Phase Application filed under 35 U.S.C. §371 as a national stage of PCT/EP2009/053257, filed on Mar. 19, 2009, claiming the benefit of European Patent Application 08103138.7, filed on Mar. 28, 2008, the content of each of which is hereby incorporated by reference in its entirety.

The present disclosure relates to a device for preparing a liquid foodstuff or semi-luxury product from a packaged product contained in a portioned packaging. In addition, the disclosure relates to an arrangement with a device of this type and a portioned packaging. Such devices are used, above all, for the preparation of beverages such as, for example, coffee, tea or chocolate. The portioned packagings can be capsules by means of which a dry substance or at the most also other packaged goods can be packaged in an advantageous manner.

Portioned packagings for the preparation of liquid foodstuff or semi-luxury products have been known and have been customary for a long time. EP 1 101 430 or EP 1 344 722, for example, have made known comparable capsules. The capsules have a cup-like basic body provided with a flange-like collar, said basic body being closed in the region of the collar by means of a film.

A device by way of which the extraction product contained in such a capsule is extractable, is described, for example, in WO 2007/017455. The device includes a pivotable chamber part, which has a cavity for accommodating the capsule. For simple handling of the capsule by a consumer, the chamber part is aligned vertically in an insertion position and horizontally in a closed or extraction position.

Devices have become known then where the chamber parts just carry out translatory movements. A device of this type is shown, for instance, in EP 1 757 212 A2. In this case, a generically comparable device is described that has two chamber parts that are moveable in relation to each other on a horizontal axis. The capsule is inserted into an intermediate position by the effect of gravitational force via laterally arranged guiding and blocking means. To create an extraction position, the blocking means are pushed to the side when passing over the moveable chamber part, the capsule thereby being released from the blocking means. The mechanism for blocking and releasing the capsule from the blocking means is comparatively complex and requires special components.

Consequently, it is desired to create a device of the aforementioned type that is simplified with regard to functionality and design. It is to be possible to produce the device easily. This object is achieved with a device that has the features of a positioning unit, two chamber parts that are moveable in relation to each other to be spaced apart from each other in an open position, and moveable in relation to each other for creating a closed position and to form a chamber. The portioned packaging has a collar, and is positioned by impinging on the collar in an insertion position between two chamber parts that are in the open position. The portioned packaging is enclosable in the chamber formed in the dosed position, and in the dosed position the medium is conductable through the portioned packaging. The positioning unit is developed in such a manner that, when the chamber parts are moved from the open position into the dosed position, the positioning unit acts on the collar in such a manner that, by deforming, the collar is releasable from the insertion position in the positioning unit.

Due to the fact that when the chamber parts move from the open position into the closed position (closing operation), the positioning unit acts on the collar of the portioned packaging in such a manner that the collar is releasable from the insertion position by means of deforming, a considerable simplification of the device is effected. Thus, with this type of development of the device, there is no need for special mobility of the positioning unit for releasing the collar from the positioning unit as all that has to be moved is the collar.

The portioned packaging can be a capsule that contains an extraction product such as, for example, coffee or tea. To achieve the insertion position, the portioned packaging can be insertable into the positioning unit preferably by means of gravitational force. One chamber part can be realized as a capsule holder with a cavity for accommodating the capsule and the other chamber part can be realized as a closure part for closing the cavity. At least one of the chamber parts, preferably however each chamber part, can have associated therewith means for penetrating the capsule and for conducting the extractant through the closed extraction chamber and through the capsule.

In a first embodiment, at least one of the chamber parts is displaceable in the axial direction. For release from the insertion position, the positioning unit can have a stop face for the sectional folding over or bending over of the collar in the axial direction. Clearly, the positioning unit does not have to be moveable in a transverse direction to the axial direction. In other words, the positioning unit can be non-moveable with reference to a transverse direction preferably extending at right angles to the axial direction.

It can be advantageous when the positioning unit includes two holding jaws situated opposite each other with guiding means in which the collar of the portioned packaging is receivable in the insertion position. The positioning unit is preferably realized in such a manner that the capsule is aligned in the insertion position approximately precisely with the extraction position to be assumed subsequently. The capsule is situated in the extraction position when the chamber parts are situated in a preferably sealing closed position and enclose the portioned packaging in the chamber.

It can be particularly advantageous when the guiding means form a guiding channel that tapers in the insertion direction of the capsule. The respective guiding channel can be wedge-shaped. Obviously, however, it is also conceivable for the guiding channel to have side walls that extend in parallel at least in a sectional manner. The guiding channel can be in the form of a groove.

To secure the insertion position, the guiding channel can be defined. In the event of a guiding groove, it can be closed for example in the insertion direction by a groove closure that is realized preferably in a complementary manner to the collar. As an alternative, the guiding groove can have a groove bottom that tapers in the insertion direction. The two groove bottoms lying opposite each other can consequently define a V-shape or wedge shape.

For a precise securement of the insertion position it can be advantageous when the collar is held in a clamping manner in the guiding channel in the insertion position. Obviously, however, it is also conceivable to provide a clearance fit in the insertion position.

With regard to functionality and handling, it can be advantageous when, with reference to the insertion direction, the guiding means have an insertion portion and a positioning portion connected thereto, wherein the positioning portion is set back in relation to the insertion portion for the passing of one of the chamber parts during the closing operation. The set-back positioning portion has the further advantage that the overlapping region between positioning unit and collar of the portioned packaging is reduced, thereby simplifying the deforming of the collar.

It can be particularly advantageous when the guiding means is realized with groove-like guiding channels, a guiding channel in a portion that secures the insertion position having a maximum groove depth of 2 mm, preferably a maximum depth of 1 mm. Theoretically it would also be conceivable to provide the guiding channel without a groove bottom or with a groove bottom that has been deepened further. In this case, the positioning unit would have to be realized in such a manner that the maximum penetration depth of the collar into the guiding channel is 2 mm, preferably 1 mm. The positioning unit could also have a part circular-shaped accommodating means for the collar extending over a sector.

Entrainment means can be located on the positioning unit, by way of which entrainment means the capsule is removable from a cavity formed by one of the chamber parts during an opening operation for restoring the open position from the closed position.

The entrainment means can be an undercut located on the holding jaw, via which undercut the collar is engageable during the opening operation for pulling out the capsule in the axial direction.

In addition it can be advantageous when the collar is supportable on a holding edge, which is moveable in the axial direction in relation to the positioning unit and is associated with one chamber part. The holding edge, in this case, can define a bending point for the folding over of the collar during the closing operation.

It can be particularly advantageous when a beveling or recess connects to the holding edge for the short-term reception of the folded-down collar during the closing operation. Unwanted damage or jamming of the collar can be avoided in this manner.

In one advantageous embodiment, one chamber part can be located in the device in a fixed manner and the other chamber part in a moveable manner. In this case, the positioning unit can be moveable in the axial direction together with the moveable chamber part.

The fixed chamber part can be dimensioned with regard to its outer configuration in such a manner that it is insertable between the holding jaws during the closing operation.

A further aspect relates to an arrangement for preparing a liquid foodstuff or semiluxury product with a portioned packaging and the afore-described device.

Finally the disclosure also relates to a portioned packaging, in particular a capsule for use in the afore-described device. The portioned packaging is characterized by a preferably circumferential collar, which is realized so as to be flexible in such a manner that during the closing operation, said collar is deformable by the positioning unit during the closing operation for releasing the holding impingement in the insertion position. At least the collar, preferably however also the capsule body connecting to the collar can be produced from a flexible material that has resilient restoring characteristics after deformation. Thanks to said restoring characteristics, the collar is only deformed for a short time during the closing operation. Once the closing operation has been concluded, i.e. therefore in the closed position, the collar is situated back in its original position. The collar, in this case, can extend outwards from the capsule body in the radial direction.

BRIEF DESCRIPTION OF THE DRAWINGS

Further advantages and individual features of the invention are produced from the following description of exemplary embodiments and the drawings, in which:

FIG. 4 shows a detailed view from FIG. 2 with an enlarged representation of a positioning unit, FIG. 5 shows the enlarged positioning unit from the representation in FIG. 3, FIG. 6a shows a cross section through the device (sectional plane m-m) in FIG. 4, FIG. 6b shows another cross section representing half the device (sectional plane k-k) in FIG. 4, FIG. 6c shows the cross section in FIG. 6b, but with a capsule inserted, FIG. 6d shows a greatly enlarged representation of the detail F in FIG. 6c, FIG. 7 shows a top view of a device in the open position with a capsule inserted, FIG. 8 shows a longitudinal section through the device in the open position with a capsule in the insertion position, FIG. 11 shows a section through the device (sectional plane q-q) in FIG. 10, FIG. 12 shows a greatly enlarged representation of the detail D in FIG. 11, FIG. 13 shows the detail D in FIG. 12, but after a further second part step of the closing operation, FIG. 22 shows a perspective representation of a device according to a second exemplary embodiment.

DETAILED DESCRIPTION

Figure 1:
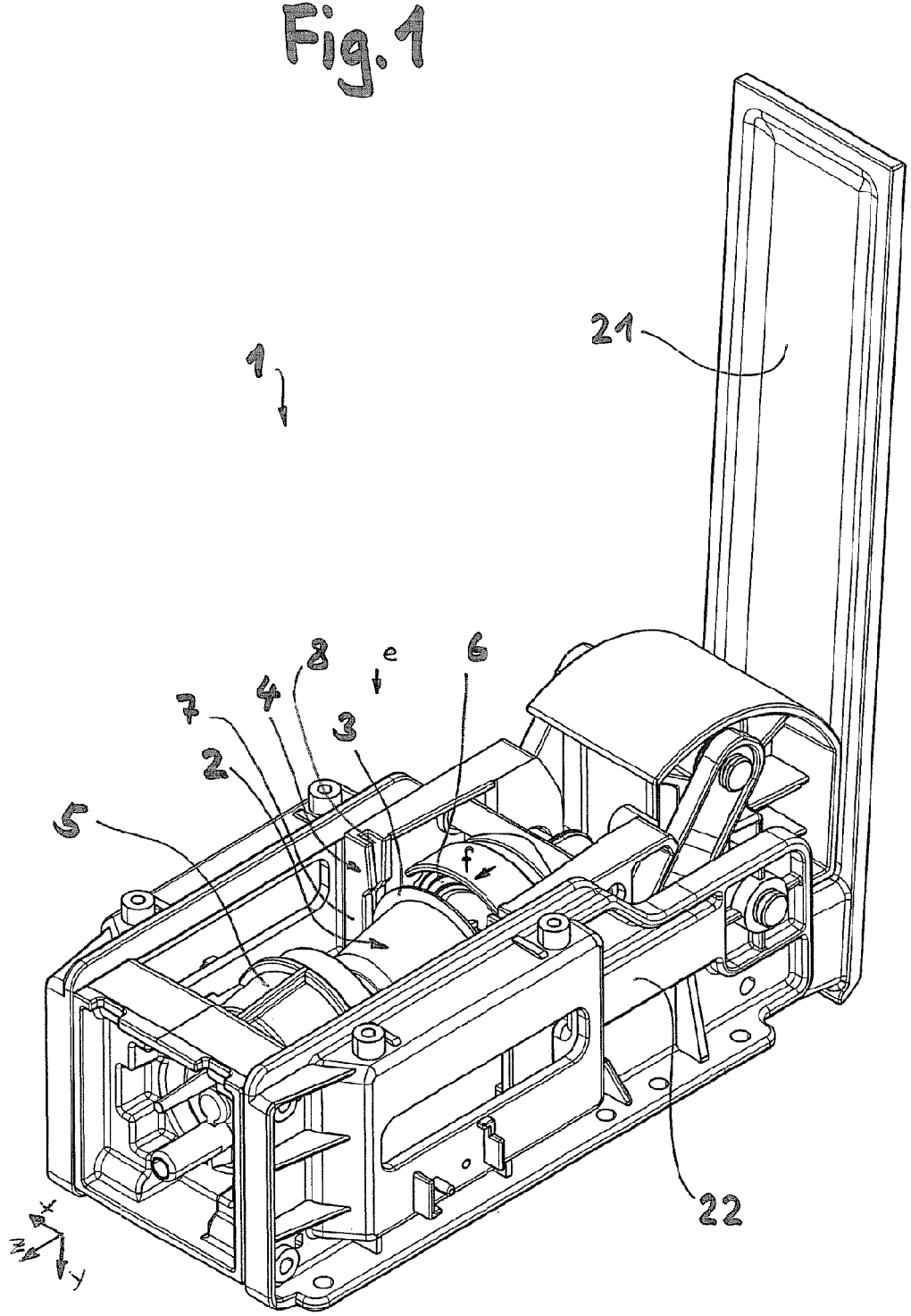
FIG. 1 shows a perspective representation of a device in the open position with a capsule in the insertion position.

FIG. 1 shows a device 1 in the form of a module that can be installed, for example, in a coffee machine. The contents of a capsule 2 containing coffee powder can be extracted using a device of this type. Obviously the capsule can also contain other packaged products, in particular e.g. soluble dry substances. The capsule 2 comprises a potlike or cup-like capsule body, which is preferably produced from a plastics material such as, for example, polypropylene and can be produced by using a deep drawing method or an injection molding method. A collar, given the reference 3, connects to the capsule body, said collar defining an open end of the capsule body. The capsule is closed by means of a cover film that, as a rule, is also produced from plastics material.

The device described below is basically suitable for all types and shapes of portioned packagings that are provided with collars.

The device 1 has two chamber parts 5 and 6, which are displaceable in relation to each other in the axial direction z. In the case of the present exemplary embodiment, the chamber part 6 formed as a closure part is moveable, whereas the other chamber part 5 is located in a fixed manner in the device 1. The chamber part 5 is developed as a capsule holder with a cavity in which the capsule 2 is accommodatable. The capsule is positioned with the assistance of a positioning unit 4 in an insertion position between the chamber parts 5 and 6 that are spaced apart in the open position. The moveable chamber part 6 is mounted so as to be displaceable between two support halves 22 of the module. A Cartesian coordinates system is indicated by x, y and z. An axial direction is indicated by z. The closing and opening operation is effected in this direction. The corresponding closing direction is identified by an arrow f. The insertion direction is indicated by an arrow e. The closing movement is effected manually by actuating a pivot lever 21. The device 1 can be installed advantageously, horizontally aligned, in a corresponding machine. This type of installation makes it possible for the capsule 3 to be able to be moved into the insertion position in a simple manner by means of gravitational force. Obviously, other types of installation (e.g. aligned vertically instead of horizontally) are also conceivable.

Each of the chamber parts 5 and 6 has means (not shown) for penetrating the capsule and for conducting the extractant through the capsule. In the following figures of the first exemplary embodiment, however, for reasons of simplicity, there is no representation of the penetration means (cf. however FIG. 22).

Figure 2:
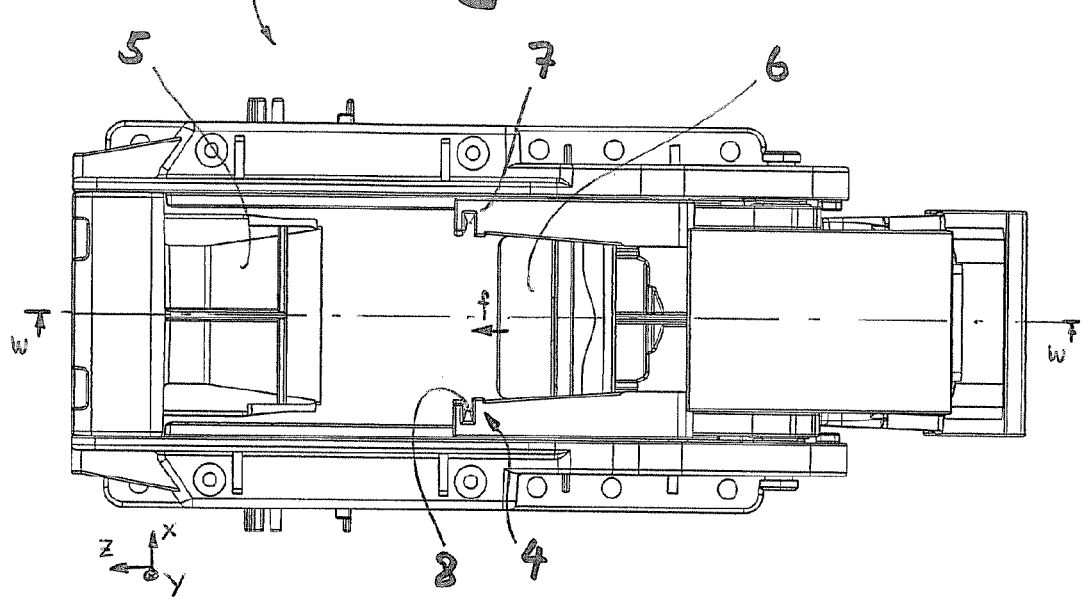
FIG. 2 shows a top view of the device in FIG. 1, but without a capsule.
Figure 3:
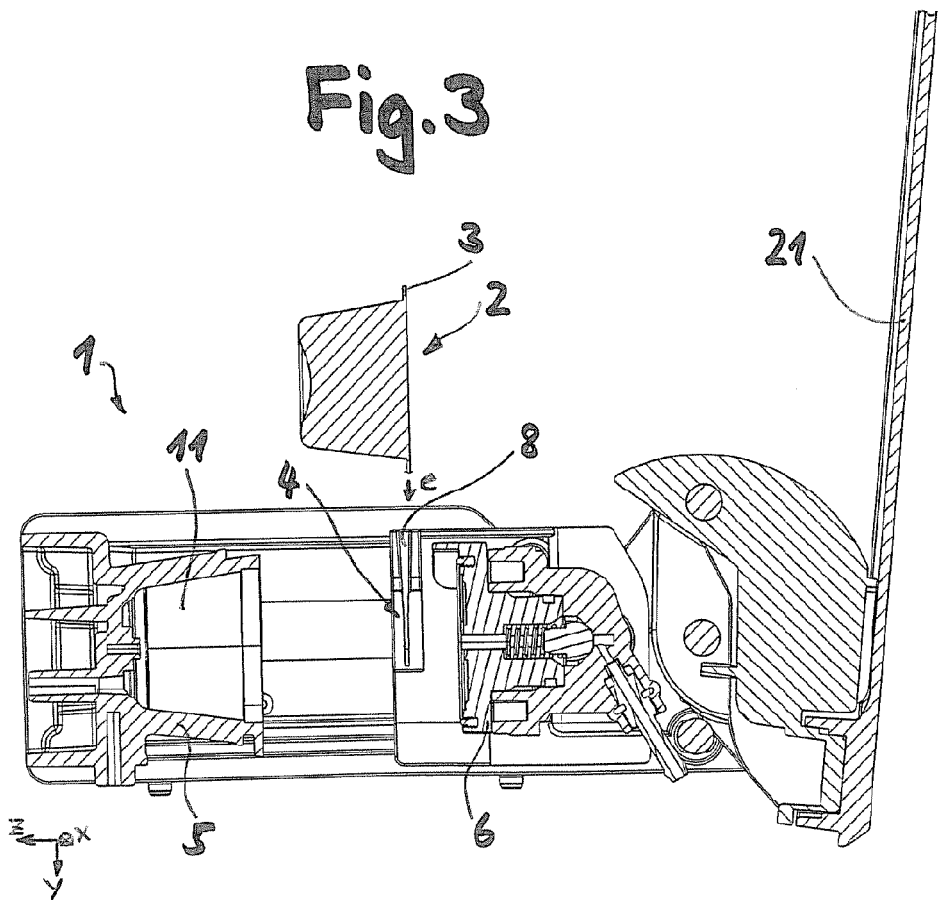
FIG. 3 shows a longitudinal section through the device in the open position (sectional plane w-w in FIG. 2), before the capsule is inserted.

In FIGS. 2 and 3 as well as 7 and 8, the device 1 is shown in top view and a lateral longitudinal sectional representation. As can be seen in FIG. 3, the capsule 2 can be inserted into the device 1 from above. The positioning unit 4 has in each case laterally arranged holding jaws 7 with guiding channels 8 into which the collar 3 of the capsule 2 is insertable. In FIG. 8 the capsule 2 is finally recognizable in its insertion position in the device 1.

It can clearly be seen from FIGS. 4 and 5 that the guiding channel 8 is in the form of a guiding groove. The references 18 and 18' are given to the side walls of the guiding channel 8, between which the collar (not shown here) is accommodatable in the manner of a sandwich. The guiding channel 8 tapers in the insertion direction e. The two side walls 18 and 18' located opposite each other are evidently aligned in a wedge-shaped manner.

FIGS. 5 and 6a show, among other things, that an insertion portion 14 with a positioning portion 15 connected thereto is provided at the guiding channel. The aim of the first portion 14 is to enable as simple an insertion of the capsule as possible. The second portion 15 is set back in relation to the portion 14, the oppositely situated chamber part 5 on the one hand thereby being moveable past. On the other hand, an advantageous deforming (described in more detail below) of the collar is allowed for in this manner. FIG. 6b shows that the groove bottom 17 of the guiding channel is realized as a wedge face that tapers inclinedly downward. The reference 19 is given to an injector bottom of the closure part 6, on which an injector plate (not shown) with penetration means is attachable. FIG. 6c shows the capsule 2 in the insertion position in the positioning unit. With reference to the insertion direction, the groove bottom 17 initially extends straight, but is developed in a circular manner in this section complementarily to the capsule edge in a portion that secures the insertion position. The diameter of the edge 3 is identified by d and is, for example, 40 mm. Details of the precise insertion position can then be seen in FIG. 6d. As shown in FIG. 6d, the maximum depth of penetration of the collar 3 in the guiding channel is relatively small. The depth of penetration, given the reference t, is ca. 0.7 mm with a collar diameter of 40 mm. The broken line 24 indicates the inwardly turned boundary of the side wall (18) of the guiding channel. It can be seen in FIG. 8 that the capsule 2 is aligned precisely coaxially to the cavity 11 thanks to the positioning unit 8.

Figure 9:
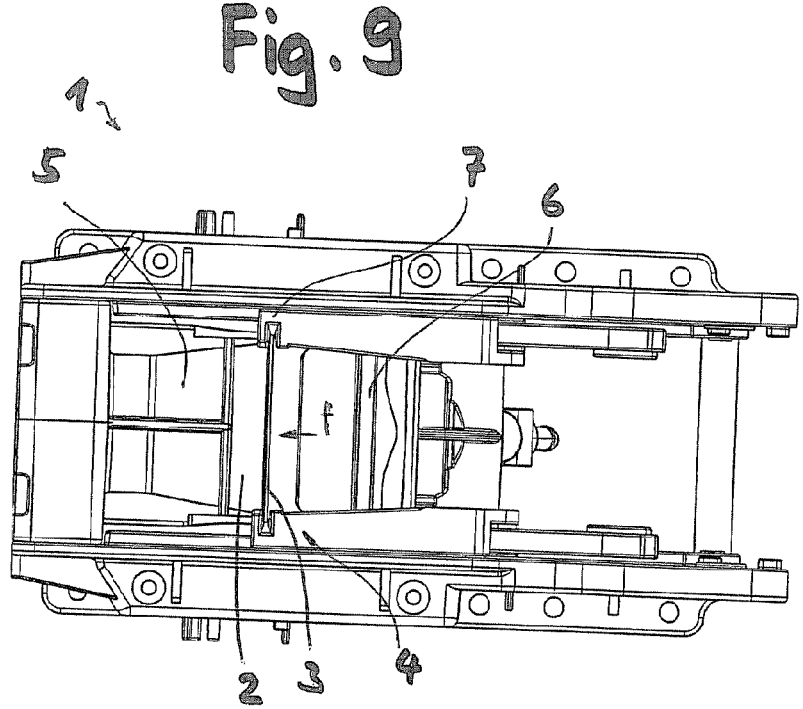
FIG. 9 shows a top view of the device in FIG. 7, but after a first part step of the closing operation (without actuating-lever)
Figure 10:
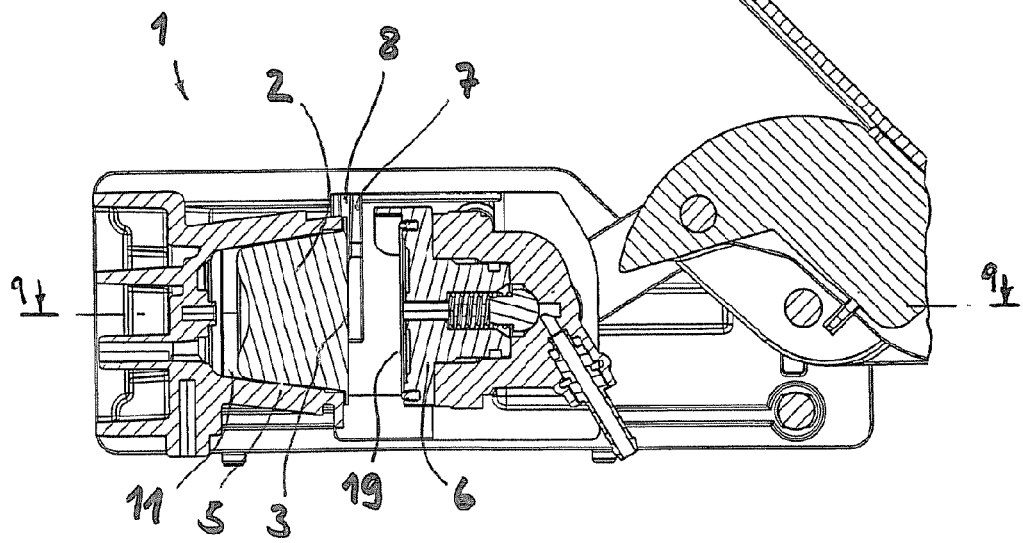
FIG. 10 shows a longitudinal section through the device in the position in FIG. 9 (with actuating-lever)
Figure 14:
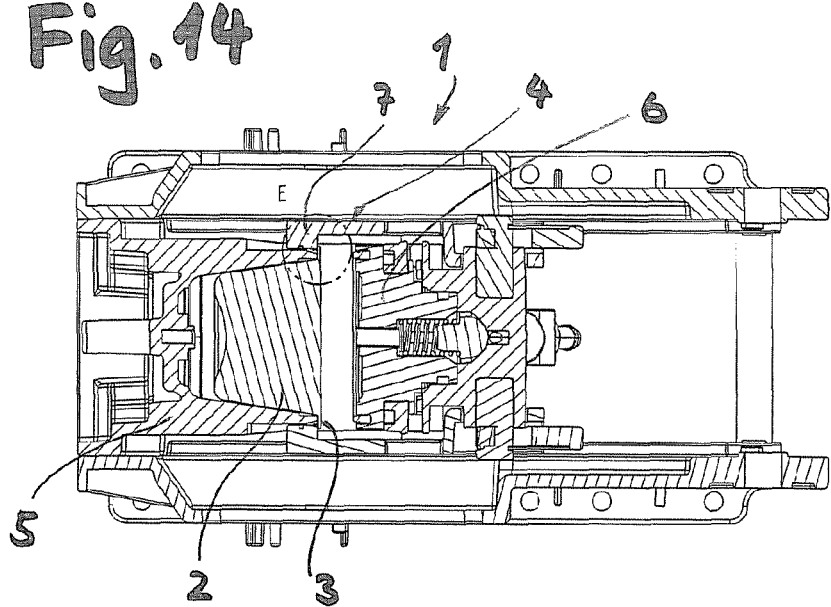
FIG. 14 shows the device in FIG. 11 after further continuation of the closing movement in relation to FIG. 13.
Figure 15:
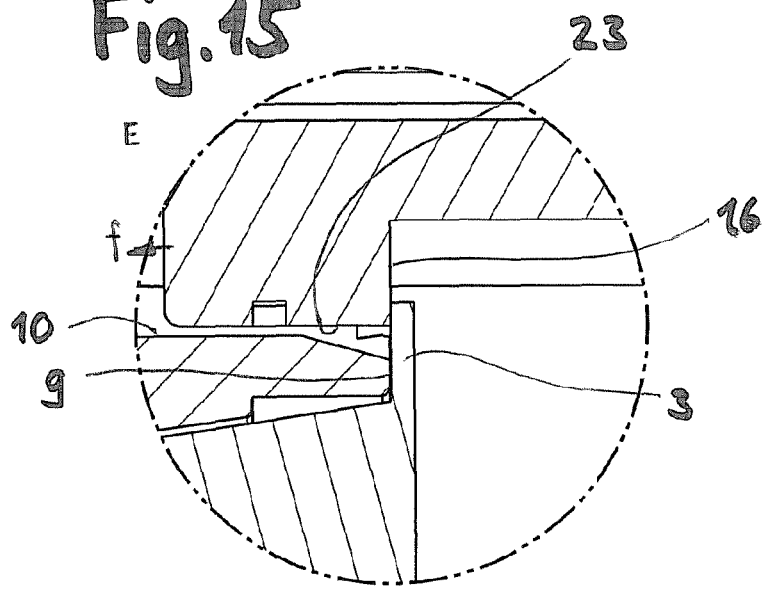
FIG. 15 shows a greatly enlarged representation of the detail E in FIG. 14.

In FIGS. 9 to 11 the chamber part 6 together with the positioning unit 4 has been moved a first part in the f-direction. As can be seen in FIG. 12, the collar 3 here abuts against a holding edge 9 of the fixed chamber part 5. It can also be seen in FIG. 12 that a beveling 10 connects to the holding edge 9. If the holding jaw 7 is then moved further in the f-direction, the collar 3 becomes bent over or folded over. The side wall 18 of the guiding channel 8 forms for this purpose a corresponding stop face that acts on the collar 3. This position can be seen in FIG. 13. FIG. 13 clearly shows as an example that the collar is folded over. The folded-over collar 3' lies on the beveling 10, thereby avoiding being folded too far. If the holding jaw 7 (together with the chamber part 6) is then moved further in the closing direction, the folded-over collar 3' moves off the sliding face, given the reference 23, until, after reaching the undercut 16, it is released again from the sliding impingement. By the capsule and in particular the collar 3 being made from a resilient material, the collar assumes its original shape (FIG. 15) on account of its restoring force.

Figure 16:
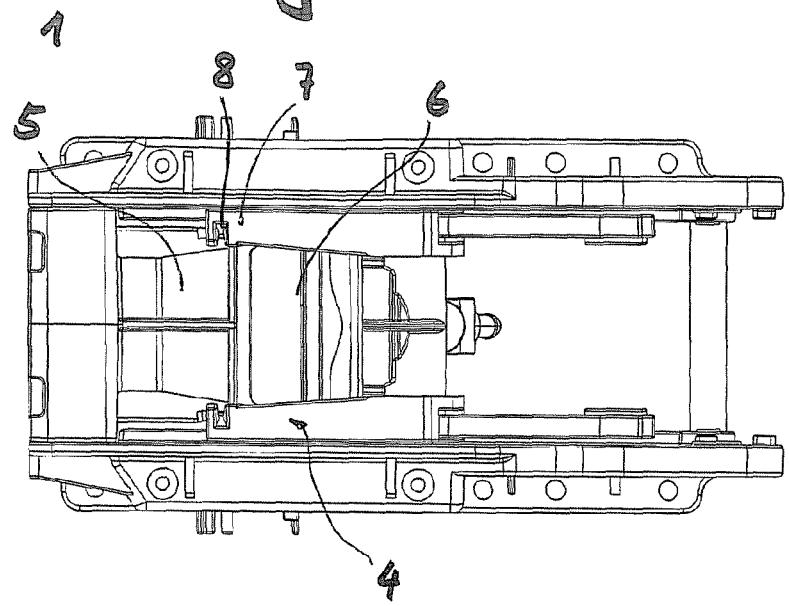
FIG. 16 shows a top view of the device in FIG. 14 after total closure (closed position)
Figure 17:
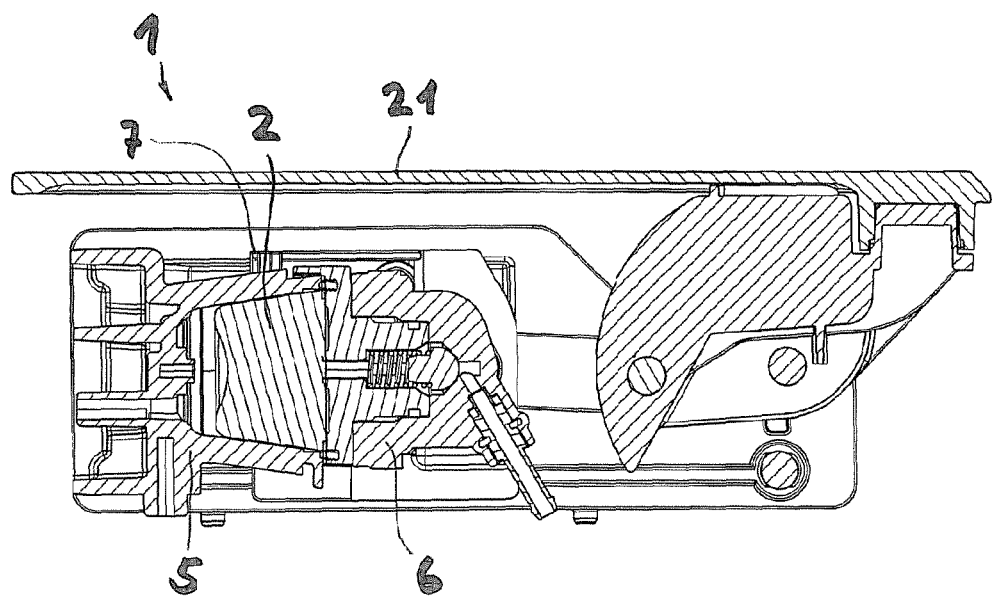
FIG. 17 shows a longitudinal section through the device in FIG. 14 or 16 in the closed position.

In FIGS. 16 and 17 the device is shown in the closed position. In this position the capsule 2 is enclosed in the chamber that is formed by the chamber parts 5 and 6 pressed against each other. In this position an extraction liquid such as, for example, water can be conducted through the capsule. The pumps, valves, flow-type heaters etc. necessary for this are known to the skilled artisan and are not represented or described here.

Figure 18:
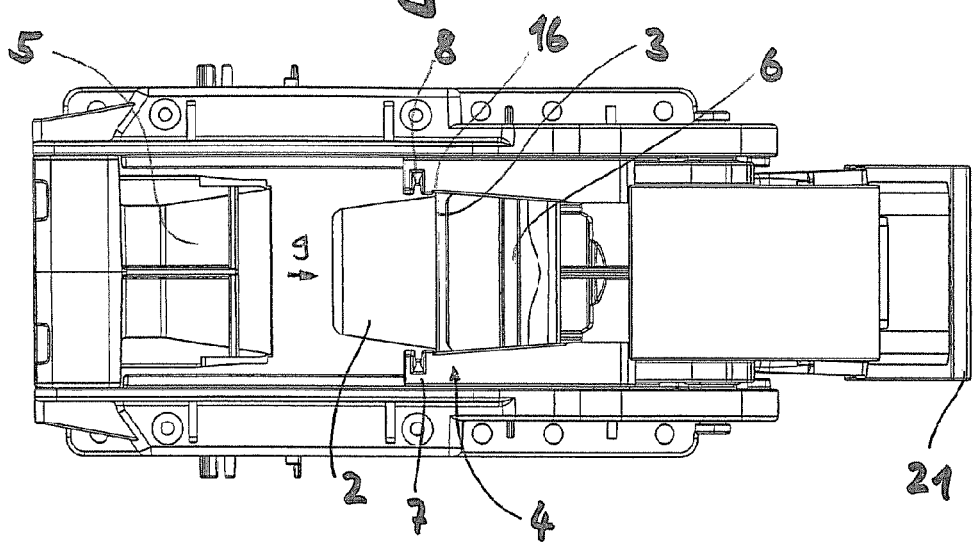
FIG. 18 shows a top view of the device after restoring the open position with the capsule removed.
Figure 19:
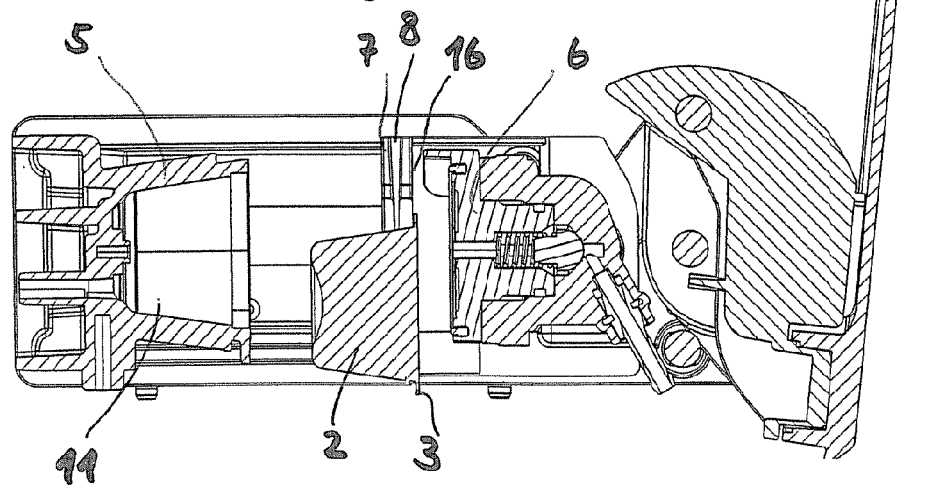
FIG. 19 shows a longitudinal section through the device in FIG. 18 with a capsule dropping out.
Figure 20:
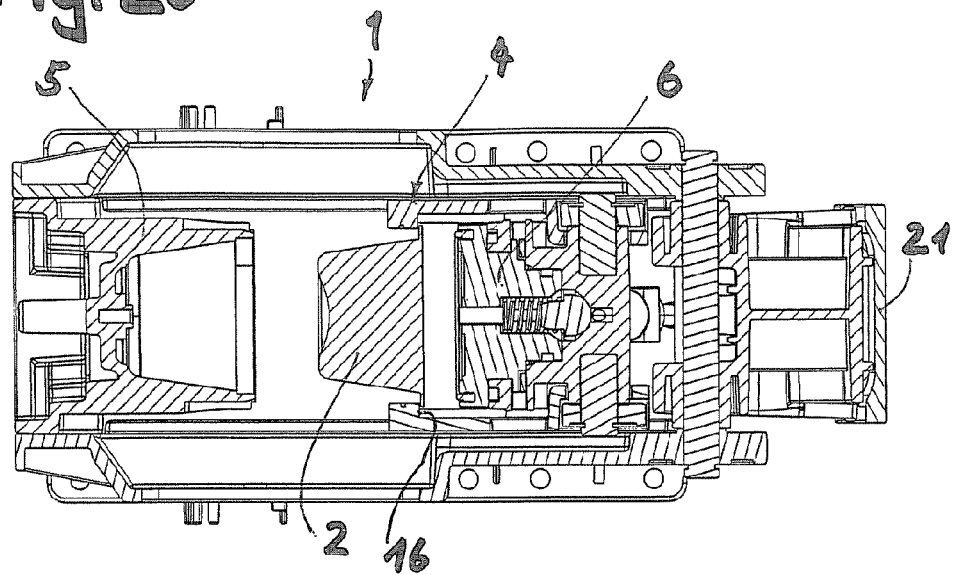
FIG. 20 shows a top view of a sectional representation of the device in the position in FIG. 18.

Once the beverage preparation has been completed, the pivot lever 21 can be pivoted up and thus the opening operation obtained. FIGS. 18 to 20 show an open position after the pivoting up. As can be seen in particular from FIG. 19, the capsule 2 drops out of the device through its own weight at the latest in the open position (or during the transition into the open position). The capsule 2 is removable in a simple manner under the effects of gravitational force through the particular shape of the positioning unit 4.

Figure 21:
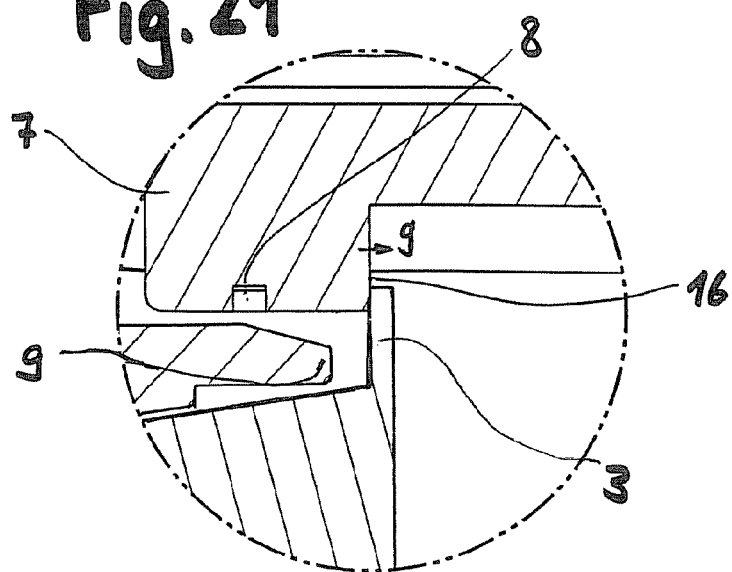
FIG. 21 shows the detail in FIG. 15, but with a representation of the removal operation of the capsule out of a cavity of a chamber part

The undercut 16 can be used to pull the capsule 2 out of the cavity 11. If, namely, the holding jaw 7 is moved in the g-direction during the opening operation, the undercut 16 abuts against the collar 3 and thus pulls the capsule out (FIG. 21).

As can be seen from the second exemplary embodiment in FIG. 22, the positioning unit does not have to be compulsorily rigid. The first exemplary embodiment in FIGS. 1 to 21 describes a positioning unit that is certainly displaceable together with the moveable chamber part; it is otherwise, however, non-moveable. In particular, it is non-moveable with reference to the x-direction (cf. FIG. 1). FIG. 22 shows an exemplary embodiment for the device where the positioning unit is at least moveable in a limited manner. Said device is characterized among other things in that double-walled holding jaws 7 are provided for the positioning unit 4, said double-walled holding jaws being able to yield in the manner of a parallelogram in the axial direction during the closing operation. The holding jaws 4 are components made of spring steel. In addition the positioning unit in this case is located fixedly on the frame and does not move together with the closure part 6. Rather this latter pushes the capsule out of the positioning unit and transfers it into the capsule holder 5 without it being able to drop out at the same time. In addition, penetration means 12 for perforating a cover film of the capsule 2 and for conducting the extraction medium can be seen in FIG. 22.

The invention claimed is:

1. A device for preparing a liquid foodstuff or semi-luxury product from a packaged product contained in a portioned packaging with a medium, the device comprising:
   a positioning unit, and
   two chamber parts that are moveable in relation to each other to be spaced apart from each other in an open position, and the chamber parts are moveable in relation to each other for creating a closed position and to form a chamber in the closed position,
   wherein the portioned packaging has a collar, and is positionable via the positioning unit by impinging on the collar in an insertion position between the two chamber parts that are in the open position, and wherein the portioned packaging is enclosable in the chamber formed in the closed position,
   wherein in the closed position the medium is conductable through the portioned packaging,
   wherein the positioning unit is developed in such a manner that, when the two chamber parts are moved from the open position into the closed position, the positioning unit acts on the collar in such a manner that, by deforming, the collar is releasable from the insertion position in the positioning unit,
   wherein, on the positioning unit, at least one entrainment means is located, by means of which the portioned packaging is removable from a cavity formed by one of the chamber parts during an opening operation for restoring the open position from the closed position.

2. The device as claimed in claim 1, wherein the portioned packaging is a capsule.

3. The device as claimed in claim 1, wherein the collar is circumferential.

4. The device as claimed in claim 1, wherein at least one of the chamber parts is displaceable in the axial direction and that for the release from the insertion position, the positioning unit has a stop face for the sectional folding over or bending over of the collar in the axial direction.

5. The device as claimed in claim 1, wherein the positioning unit includes two holding jaws situated opposite each other with guiding means in which the collar of the portioned packaging is receivable in the insertion position.

6. The device as claimed in claim 1, wherein the entrainment means is an undercut located on the holding jaw, via which undercut the collar is graspable for pulling the portioned packaging out in the axial direction during the opening operation.

7. A device for preparing a liquid foodstuff or semi-luxury product from a packaged product contained in a portioned packaging with a medium, the device comprising:
   a positioning unit, and
   two chamber parts that are moveable in relation to each other to be spaced apart from each other in an open position, and the chamber parts are moveable in relation to each other for creating a closed position and to form a chamber in the closed position,
   wherein the portioned packaging has a collar, and is positionable via the positioning unit by impinging on the collar in an insertion position between the two chamber parts that are in the open position, and wherein the portioned packaging is enclosable in the chamber formed in the closed position,
   wherein in the closed position the medium is conductable through the portioned packaging,
   wherein the positioning unit is developed in such a manner that, when the two chamber parts are moved from the open position into the closed position, the positioning unit acts on the collar in such a manner that, by deforming, the collar is releasable from the insertion position in the positioning unit,
   wherein the positioning unit includes two holding jaws situated opposite each other with guiding means in which the collar of the portioned packaging is receivable in the insertion position,
   and wherein the guiding means have in each case a guiding channel that tapers in the insertion direction of the portioned packaging.

8. The device as claimed in claim 7, wherein the guiding channel is dimensioned in such a manner that the collar is held in a clamping manner in the insertion position in the guiding channel.

9. The device as claimed in claim 5, wherein the guiding means, with reference to the insertion direction, have an insertion portion and a positioning portion that is connected thereto, wherein the positioning portion is set back in relation to the insertion portion for the passing of one of the chamber parts during the closing operation.

10. The device as claimed in claim 5, wherein the guiding means are realized as groove-like guiding channels, which have a maximum groove depth of 2 mm in a portion that secures the insertion position.

11. The device as claimed in claim 10, wherein the maximum groove depth is 1 mm.

12. A device for preparing a liquid foodstuff or semi-luxury product from a packaged product contained in a portioned packaging with a medium, the device comprising:
   a positioning unit, and
   two chamber parts that are moveable in relation to each other to be spaced apart from each other in an open position, and the chamber parts are moveable in relation to each other for creating a closed position and to form a chamber in the closed position,
   wherein the portioned packaging has a collar, and is positionable via the positioning unit by impinging on the collar in an insertion position between the two chamber parts that are in the open position, and wherein the portioned packaging is enclosable in the chamber formed in the closed position,
   wherein in the closed position the medium is conductable through the portioned packaging,
   wherein the positioning unit is developed in such a manner that, when the two chamber parts are moved from the open position into the closed position, the positioning unit acts on the collar in such a manner that, by deforming, the collar is releasable from the insertion position in the positioning unit,
   wherein the collar is supportable on a holding edge, which is moveable in the axial direction in relation to the positioning unit and is associated with a chamber part, and in that the holding edge defines a bending point for the folding over of the collar during the closing operation.

13. The device as claimed in claim 12, wherein a beveling connects to the holding edge for the short-term reception of the folded-over collar.

14. A device for preparing a liquid foodstuff or semi-luxury product from a packaged product contained in a portioned packaging with a medium, the device comprising:
   a positioning unit, and
   two chamber parts that are moveable in relation to each other to be spaced apart from each other in an open position, and the chamber parts are moveable in relation to each other for creating a closed position and to form a chamber in the closed position,
   wherein the portioned packaging has a collar, and is positionable via the positioning unit by impinging on the collar in an insertion position between the two chamber parts that are in the open position, and wherein the portioned packaging is enclosable in the chamber formed in the closed position,
   wherein in the closed position the medium is conductable through the portioned packaging,
   wherein the positioning unit is developed in such a manner that, when the two chamber parts are moved from the open position into the closed position, the positioning unit acts on the collar in such a manner that, by deforming, the collar is releasable from the insertion position in the positioning unit,
   wherein one chamber part is located in the device in a fixed manner and the other chamber part in a moveable manner, and that the positioning unit is moveable in the axial direction together with the moveable chamber part.

15. The device as claimed in claim 14, wherein the fixed chamber part is dimensioned with regard to its outer configuration in such a manner that it is insertable between the holding jaws during the closing operation.

16. An arrangement for preparing a liquid foodstuff or semi-luxury product, the arrangement comprising:
   a positioning unit, and
   two chamber parts that are moveable in relation to each other to be spaced apart from each other in an open position, and the chamber parts are moveable in relation to each other for creating a closed position and to form a chamber in the closed position,
   a portioned packaged product provided as a capsule that contains an extraction product for extraction with an extraction medium;
   wherein the portioned packaging has a collar, and is positionable via the positioning unit by impinging on the collar in an insertion position between the two chamber parts that are in the open position, and wherein the portioned packaging is enclosable in the chamber formed in the closed position,
   wherein in the closed position the medium is conductable through the portioned packaging,
   wherein the positioning unit is developed in such a manner that, when the two chamber parts are moved from the open position into the closed position, the positioning unit acts on the collar in such a manner that, by deforming, the collar is releasable from the insertion position in the positioning unit,
   wherein the positioning unit includes two holding jaws situated opposite each other with guiding means in which the collar of the portioned packaging is receivable in the insertion position, and
   wherein the guiding means have in each case a guiding channel that tapers in the insertion direction of the capsule.

17. The arrangement as claimed in claim 16, wherein the collar is circumferential.

18. The arrangement as claimed in claim 16, wherein at least one of the chamber parts is displaceable in the axial direction and that for the release from the insertion position, the positioning unit has a stop face for the sectional folding over or bending over of the collar in the axial direction.

19. The arrangement as claimed in claim 16, wherein the guiding channel is dimensioned in such a manner that the collar is held in a clamping manner in the insertion position in the guiding channel.

20. The arrangement as claimed in claim 16, wherein the guiding means, with reference to the insertion direction, have an insertion portion and a positioning portion that is connected thereto, wherein the positioning portion is set back in relation to the insertion portion for the passing of one of the chamber parts during the closing operation.

21. The arrangement as claimed in claim 16, wherein, on the positioning unit, at least one entrainment means is located, by means of which the capsule is removable from a cavity formed by one of the chamber parts during an opening operation for restoring the open position from the closed position.

22. The arrangement as claimed in claim 21, wherein the entrainment means is an undercut located on the holding jaw, via which undercut the collar is graspable for pulling the capsule out in the axial direction during the opening operation.

23. An arrangement for preparing a liquid foodstuff or semi-luxury product, the arrangement comprising:
   a positioning unit, and
   two chamber parts that are moveable in relation to each other to be spaced apart from each other in an open position, and the chamber parts are moveable in relation to each other for creating a closed position and to form a chamber in the closed position,
   a portioned packaged product provided as a capsule that contains an extraction product for extraction with an extraction medium;
   wherein the portioned packaging has a collar, and is positionable via the positioning unit by impinging on the collar in an insertion position between the two chamber parts that are in the open position, and wherein the portioned packaging is enclosable in the chamber formed in the closed position,
   wherein in the closed position the medium is conductable through the portioned packaging,
   wherein the positioning unit is developed in such a manner that, when the two chamber parts are moved from the open position into the closed position, the positioning unit acts on the collar in such a manner that, by deforming, the collar is releasable from the insertion position in the positioning unit,
   wherein the collar is supportable on a holding edge, which is moveable in the axial direction in relation to the positioning unit and is associated with a chamber part, and in that the holding edge defines a bending point for the folding over of the collar during the closing operation.

24. The arrangement as claimed in claim 23, wherein a beveling connects to the holding edge for the short-term reception of the folded-over collar.

25. An arrangement for preparing a liquid foodstuff or semi-luxury product, the arrangement comprising:
   a positioning unit, and
   two chamber parts that are moveable in relation to each other to be spaced apart from each other in an open position, and the chamber parts are moveable in relation to each other for creating a closed position and to form a chamber in the closed position, a portioned packaged product provided as a capsule that contains an extraction product for extraction with an extraction medium;

wherein the portioned packaging has a collar, and is positionable via the positioning unit by impinging on the collar in an insertion position between the two chamber parts that are in the open position, and wherein the portioned packaging is enclosable in the chamber formed in the closed position, wherein in the closed position the medium is conductable through the portioned packaging, wherein the positioning unit is developed in such a manner that, when the two chamber parts are moved from the open position into the closed position, the positioning unit acts on the collar in such a manner that, by deforming, the collar is releasable from the insertion position in the positioning unit, wherein one chamber part is located in a fixed manner and the other chamber part in a moveable manner, and that the positioning unit is moveable in the axial direction together with the moveable chamber part.

26. The arrangement as claimed in claim 25, wherein the fixed chamber part is dimensioned with regard to its outer configuration in such a manner that it is insertable between the holding jaws during the closing operation.

\* \* \* \* \*